United States Patent
Hayashi

(10) Patent No.: US 6,703,730 B2
(45) Date of Patent: Mar. 9, 2004

(54) ELECTRIC MOTOR COOLING HAVING AIR-COMMUNICATION RESTRAIN BETWEEN INTAKE DUCT AND EXHAUST DUCT, AND HAVING COOLING FAN RECEIVED IN YOKE

(75) Inventor: Yoshiaki Hayashi, Hamamatsu (JP)

(73) Assignee: Asmo Co., Ltd., Shizuoka (JP)

( * ) Notice: Subject to any disclaimer, the term of this patent is extended or adjusted under 35 U.S.C. 154(b) by 68 days.

(21) Appl. No.: 10/146,803

(22) Filed: May 17, 2002

(65) Prior Publication Data

US 2002/0175573 A1 Nov. 28, 2002

(30) Foreign Application Priority Data

May 24, 2001 (JP) ........................................ 2001-155603
Sep. 26, 2001 (JP) ........................................ 2001-293064

(51) Int. Cl.[7] .............................. H02K 5/20; H02K 9/06
(52) U.S. Cl. ........................ 310/62; 310/59; 310/60 A; 310/89
(58) Field of Search ................................. 310/58–60 A, 310/88–89

(56) References Cited

U.S. PATENT DOCUMENTS

| | | | | |
|---|---|---|---|---|
| 2,397,171 A | * | 3/1946 | Troller ........................ 417/368 |
| 3,518,467 A | * | 6/1970 | Wightman .................... 310/63 |
| 4,087,707 A | * | 5/1978 | Shinoda et al. ............... 310/63 |
| 4,092,556 A | * | 5/1978 | Mabuchi ...................... 310/57 |
| 4,562,367 A | * | 12/1985 | Kumatani ..................... 310/62 |
| 4,626,720 A | * | 12/1986 | Fukasaku et al. ............. 310/62 |
| 4,766,337 A | * | 8/1988 | Parkinson et al. ............ 310/58 |
| 4,908,538 A | * | 3/1990 | Geberth, Jr. ................. 310/59 |
| 5,998,896 A | * | 12/1999 | Early et al. .................. 310/89 |
| 6,522,036 B1 | * | 2/2003 | Chen ........................... 310/58 |

FOREIGN PATENT DOCUMENTS

JP    A-2001-061257    3/2001

* cited by examiner

Primary Examiner—Tran Nguyen
(74) Attorney, Agent, or Firm—Posz & Bethards, PLC

(57) ABSTRACT

A yoke receives an armature and a cooling fan and has air inlet and outlet openings. A water blocking cover substantially covers the inlet and outlet openings of the yoke. The cover includes an intake duct, an exhaust duct and a partitioning member. The air is drawn from outside of the cover into the air inlet openings through the intake duct upon rotation of the fan. The air is discharged from the air outlet openings to the outside of the water blocking cover through the exhaust duct upon the rotation of the fan. The partitioning member is located in a space between the water blocking cover and the yoke and restrains free communication of the air between the intake duct and the exhaust duct through the space between the water blocking cover and the yoke.

16 Claims, 13 Drawing Sheets

ELECTRIC MOTOR COOLING HAVING AIR-COMMUNICATION RESTRAIN BETWEEN INTAKE DUCT AND EXHAUST DUCT, AND HAVING COOLING FAN RECEIVED IN YOKE

CROSS REFERENCE TO RELATED APPLICATION

This application is based on and incorporates herein by reference Japanese Patent Application No. 2001-155603 filed on May 24, 2001 and Japanese Patent Application No. 2001-293064 filed on Sep. 26, 2001.

BACKGROUND OF THE INVENTION

1. Field of the Invention

The present invention relates to an electric motor having a cooling fan received in a yoke.

2. Description of Related Art

One electric motor having a cooling fan is disclosed, for example, in Japanese Unexamined Patent Publication No. 2001-61257. The motor includes a yoke housing (hereinafter, simply referred to as a yoke) and a worm housing. The cooling fan is secured around a rotatable shaft within the yoke. When the cooling fan is rotated, the air in the interior of the motor is discharged through air outlet openings provided at one end of the yoke near the cooling fan. At the same time, external air is drawn into the interior of the yoke through an air inlet opening provided in the worm housing to circulate the air in the yoke to cool the interior of the yoke.

Another type of motor similar to the above motor has been also proposed. In this motor, the air outlet openings of the above motor are used as air inlet openings, and air outlet openings are formed in the other end (near a commutator and brushes) of the yoke. By rotating the cooling fan, the external air is drawn into the yoke through the air inlet openings and is discharged through the air outlet openings. In this motor, the relatively strong air is blown to a core (armature core) and a winding portion, which act as heat sources, to cool the core and the winding portion.

In such a motor, the core and the winding portion can be effectively cooled by the strong external air blown by the cooling fan. However, the external air is also blown to the electrically conductive components, such as the commutator and the brushes. Thus, if the external air has a high salt concentration and a high humidity, the commutator and the brushes can be corroded and degraded, causing an electrical conduction failure in the commutator and the brushes.

Furthermore, if this motor is a high power motor that generates a relatively large amount of heat, a total open area of the air inlet openings and a total open area of the air outlet openings should be increased to maintain a sufficient amount of air flow throughout the interior of the motor. However, some motors, such as vehicle motors, are often placed in an watery environment, such as a rainy road, where the water is often applied to the motors. In such a case, the increase in the total open area of the air inlet openings of the yoke and also the total open area of the air outlet openings of the yoke may cause intrusion of the water (e.g., salty water) or snow into the interior of the motor through the air inlet openings and the air outlet openings. If this happens, the components received in the interior of the motor may be corroded and degraded, causing a reduction in output power of the motor.

To address this disadvantage, it is conceivable to provide a water blocking cover around the yoke of the motor. However, in many cases, the water blocking cover can disadvantageously reduce the cooling performance of the motor. That is, if the water blocking cover surrounds the yoke of the motor, a flow passage of the air is formed between the exterior of the yoke and the cover. This causes the air discharged from the yoke through the air outlet openings of the yoke to be redrawn into the air inlet openings of the yoke through the flow passage of the air. In such a case, the air heated in the interior of the yoke is circulated between the space, which is formed between the yoke and the cover, and the interior of the yoke. Thus, temperature of the circulated air is gradually raised, resulting in the reduced cooling performance of the motor.

SUMMARY OF THE INVENTION

Thus, it is an objective of the present invention to address the above disadvantages. To achieve the objective of the present invention, there is provided an electric motor including an armature, a cooling fan, a yoke and a water blocking cover. The armature includes a rotatable shaft. The cooling fan is secured to the rotatable shaft of the armature to rotate integrally with the rotatable shaft. The yoke receives the armature and the cooling fan and has at least one air inlet opening and at least one air outlet opening. The at least one air inlet opening is located at a first axial end portion of the yoke and penetrates through a wall of the yoke to introduce air into an interior of the yoke upon rotation of the cooling fan. The at least one air outlet opening is located at a second axial end portion of the yoke and penetrates through the wall of the yoke to discharge the air from the interior of the yoke upon the rotation of the cooling fan. The water blocking cover substantially blocks intrusion of water into the interior of the yoke by substantially covering the at least one air inlet opening and the at least one air outlet opening of the yoke. The water blocking cover includes an intake duct, an exhaust duct and a communication restraining portion. The air is drawn from outside of the water blocking cover into the at least one air inlet opening through the intake duct upon the rotation of the cooling fan. The air is discharged from the at least one air outlet opening to the outside of the water blocking cover through the exhaust duct upon the rotation of the cooling fan. The communication restraining portion is located in a space between the water blocking cover and the yoke and restrains free communication of the air between the intake duct and the exhaust duct through the space between the water blocking cover and the yoke.

In place of the above water blocking cover, a first water blocking cover and a second water blocking cover can be provided. The first water blocking cover substantially blocks intrusion of water into the interior of the yoke through the at least one air inlet opening by substantially covering the at least one air inlet opening and includes an intake duct, through which the air is drawn from outside of the first water blocking cover into the at least one air inlet opening upon the rotation of the cooling fan. The second water blocking cover substantially blocks intrusion of the water into the interior of the yoke through the at least one air outlet opening by substantially covering the at least one air outlet opening and includes an exhaust duct, through which the air is discharged from the at least one air outlet opening to outside of the second water blocking cover upon the rotation of the cooling fan.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

A wiper motor for driving wipers of a vehicle according to a first embodiment of the present invention will be described with reference to the accompanying drawings.

Figure 1:
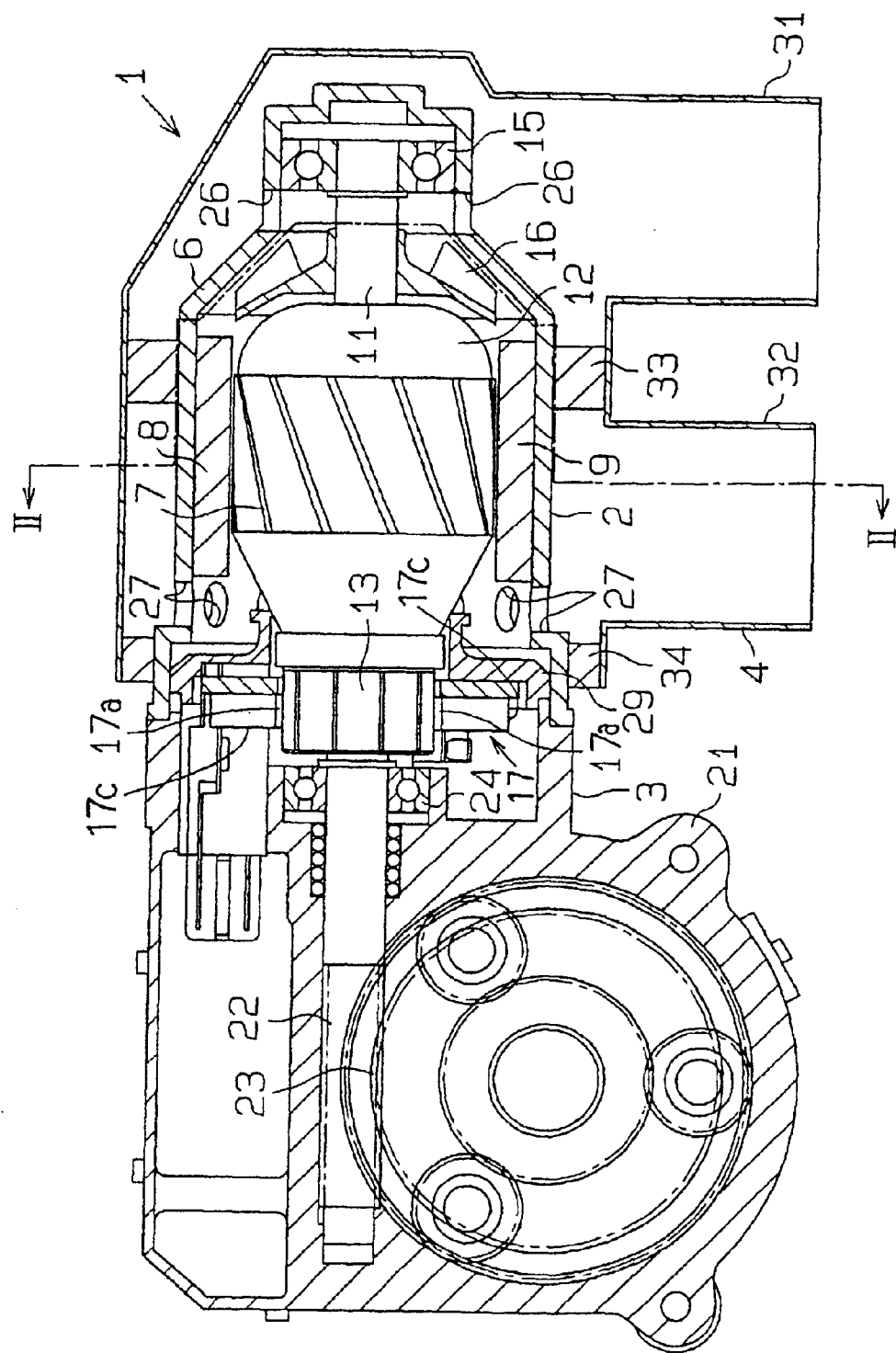
FIG. 1 is a cross sectional view of a wiper motor according to a first embodiment of the present invention.
Figure 2:
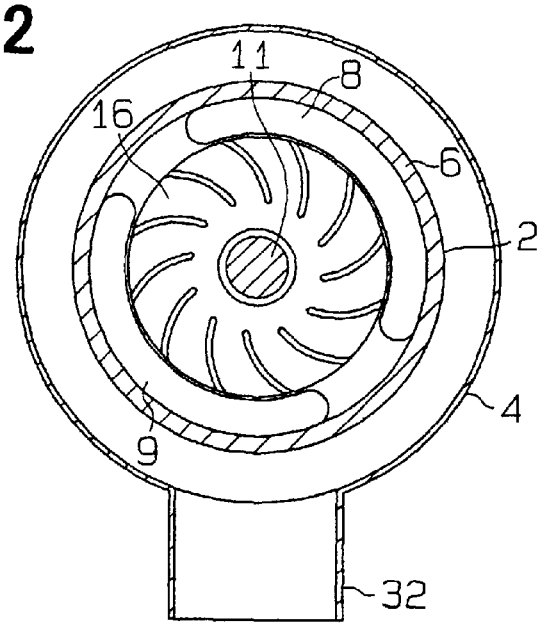
FIG. 2 is a cross sectional view taken along line II—II in FIG. 1.

As shown in FIG. 1, the wiper motor 1 includes a motor main body 2, a speed reducing unit 3 and a water blocking cover 4. The speed reducing unit 3 is secured to the motor main body 2. The water blocking cover 4 covers the motor main body 2 to restrain intrusion of water into the interior of the motor main body 2. As shown in FIGS. 1 and 2, the motor main body 2 includes a cylindrical cup-shaped yoke 6, an armature 7 and a pair of magnets 8, 9. The armature 7 is received within the yoke 6. The magnets 8, 9 are secured to an inner peripheral surface of the yoke 6.

As shown in FIG. 1, the armature 7 includes a rotatable shaft 11, a core/winding portion 12 and a commutator 13. A base end of the rotatable shaft 11 is rotatably supported by a bearing 15 secured to a base of the yoke 6. The core/winding portion 12 is secured to an axially middle portion of the rotatable shaft 11 and is radially opposed to the magnets 8, 9. The commutator 13 is secured to a distal end side of the rotatable shaft 11 (distal to the core/winding portion 12). A cooling fan 16 is secured to a base end side of the rotatable shaft 11 between the core/winding portion 12 and the bearing 15. That is, the commutator 13 is secured to the one end side of the rotatable shaft 11, and the cooling fan 16 is secured to the other end side of the rotatable shaft 11. A pair of brushes 17a are supported by brush holders 17c, respectively, in a brush holder assembly 17 and are in sliding contact with the commutator 13. The brushes 17a are diametrically opposed to each other about the commutator 13. When electric current is supplied to the core/winding portion 12 through the brushes 17a and the commutator 13, the cooling fan 16 is rotated together with the armature 7 (rotatable shaft 11).

The speed reducing unit 3 includes a gear housing (end housing) 21 and a worm gear (a worm 22 and a worm wheel 23) received in the gear housing 21. The gear housing 21 covers an open end of the yoke 6. A bearing 24 is secured to the gear housing 21 to rotatably support the distal end side of the rotatable shaft 11. The worm 22 is formed in the distal end of the rotatable shaft 11, and the worm wheel 23 is meshed with the worm 22.

Air inlet openings 26 for introducing external air into the yoke 6 are circumferentially arranged along a peripheral wall of the yoke 6 at the base side (first end portion) of the yoke 6 near the cooling fan 16. Furthermore, air outlet openings 27 for discharging the air from the yoke 6 are circumferentially arranged along the peripheral wall of the yoke 6 at the open end side (second end portion) of the yoke 6 near the commutator 13. In the present embodiment, as shown in FIG. 3, the air inlet openings 26 and the air outlet openings 27 are circumferentially arranged along the entire peripheral wall of the yoke 6 to maintain sufficient flow (flow rate) of the air through the interior of the motor 1.

Figure 4:
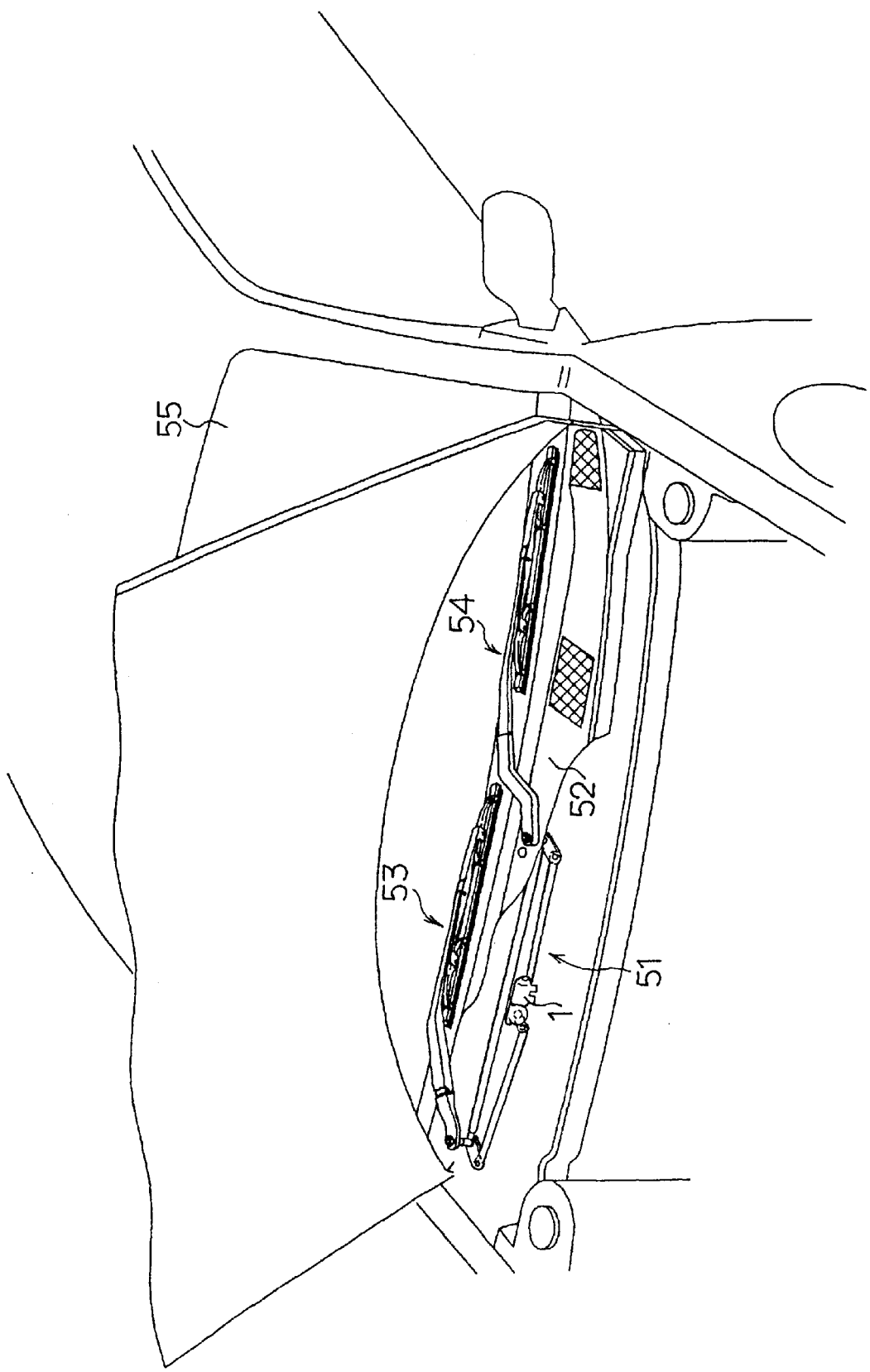
FIG. 4 is a perspective schematic fragmented view showing the wiper motor installed under a cowl louver of a vehicle.

As shown in FIG. 1, a brush cover 29 acting as a shielding member is provided at the open end of the yoke 6. The wiper motor 1 according to the present embodiment is installed in a vehicle. More specifically, as shown in FIG. 4, the wiper motor 1 is arranged below a cowl louver 52 of the vehicle and is connected to wipers 53, 54 via a link mechanism 51 to swing the wipers 53 along a windshield 55 of the vehicle. Thus, when the vehicle is driven near a beach, wet salty air is introduced into the interior of the motor 1 through the air inlet openings 26. However, in the present embodiment, the brush cover 29 restrains the wet salty air from approaching the commutator 13 and the brushes 17a. Thus, deterioration of the commutator 13 and deterioration of the brushes 17a are restrained. As a result, deterioration in commutating performance in the motor 1 can be restrained.

Figure 3:
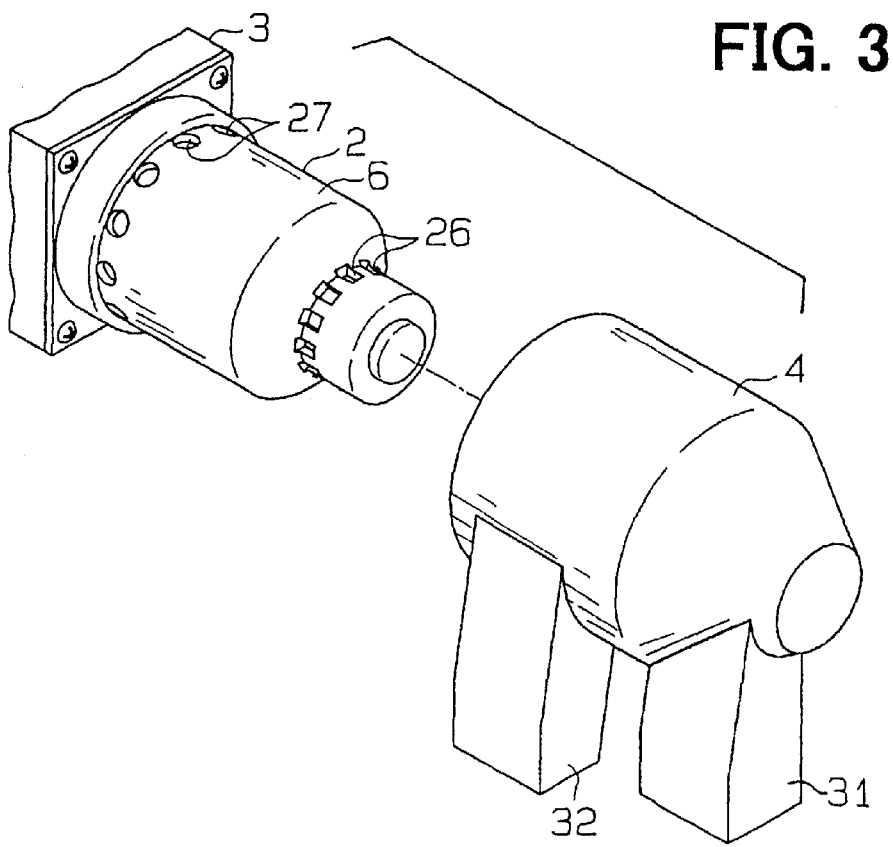
FIG. 3 is a schematic perspective view showing a motor ma in body and a water blocking cover removed from the motor main body.

As shown in FIGS. 1 to 3, the water blocking cover 4 of the present embodiment has a generally cylindrical cup shape to substantially cover the entire yoke 6 of the motor 1. The water blocking cover 4 has an intake duct 31 and an exhaust duct 32. The intake duct 31 allows communication between the air inlet openings 26 of the yoke 6 and the atmosphere. The exhaust duct 32 allows communication between the air outlet openings 27 of the yoke 6 and the atmosphere. When the motor 1 is installed in the vehicle, an external opening of the intake duct 31 and an external opening of the exhaust duct 32 are oriented in the direction of gravity (downward direction in FIG. 1).

In the present embodiment, as shown in FIG. 1, in the water blocking cover 4, a partitioning member (partition wall or communication restraining portion) 33 is arranged between the intake duct 31 and the exhaust duct 32 to restrain mixing of the intake air, which is drawn from the atmosphere through the intake duct 31, and the exhaust air, which is discharged from the yoke 6. The partitioning member 33 is formed of a strip-like damping material (e.g., a foam material, such as a closed-cell sponge, or a rubber material), which is wound into a ring shape and is bonded along an inner peripheral surface of the water blocking cover 4. An inner peripheral surface of the partitioning member 33 is in close contact with an outer peripheral surface of the yoke 6.

A seal member 34 is arranged at an open end of the water blocking cover 4, which is located near the open end of the yoke 6, to seal between the inner peripheral surface of the water blocking cover 4 and the outer peripheral surface of the yoke 6. Similar to the partitioning member 33, the seal member 34 is formed of a strip-like damping material (e.g., the foam material, such as the closed-cell sponge, or the rubber material), which is wound into a ring shape and is bonded along the inner peripheral surface of the water blocking cover 4. The inner peripheral surface of the seal member 34 is in close contact with the outer peripheral surface of the yoke 6. The seal member 34 restrains leakage of the air from the water blocking cover 4 and also restrains penetration of the water into the water blocking cover 4. Each of the partitioning member 33 and the seal member 34 also acts as a securing member for securing the water blocking cover 4 to the yoke 6.

Figure 5:
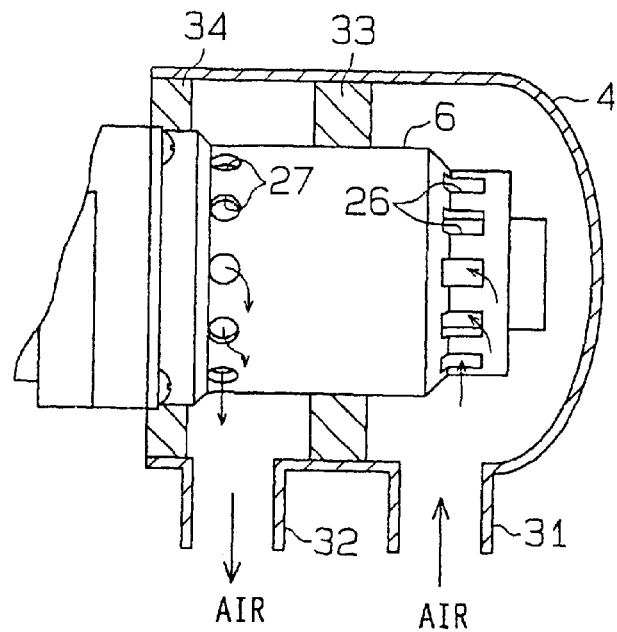
FIG. 5 is a schematic partial cross sectional view showing air flow in the water blocking cover.

When the wiper motor 1 is driven, the cooling fan 16 is rotated together with the armature 7 to create an air flow. At this time, as shown in FIG. 5, the air (external air) from the outside of the water blocking cover 4 is drawn into the interior of the water blocking cover 4 through the intake duct 31. Then, this air is introduced into the interior of the yoke 6 through the air inlet openings 26 formed in the one end side of the yoke 6 and cools the interior of the motor 1. Thereafter, the air is discharged from the yoke 6 through the air outlet openings 27 formed in the other end side of the yoke 6. In the present embodiment, the partitioning member 33 is provided in the space between the yoke 6 and the water blocking cover 4 to restrain communication between the intake duct 31 and the exhaust duct 32 through the space. Thus, the air heated in the interior of the motor 1 is not reintroduced into the intake duct 31 and is effectively discharged to the outside of the water blocking cover 4 through the exhaust duct 32. With this arrangement, the air (external air), which has the temperature lower than that of the interior of the motor 1, can be effectively introduced into the interior of the motor 1 through the intake duct 31 and the air inlet openings 26. Thus, a reduction in the cooling performance of the motor 1 can be avoided.

Figure 6:
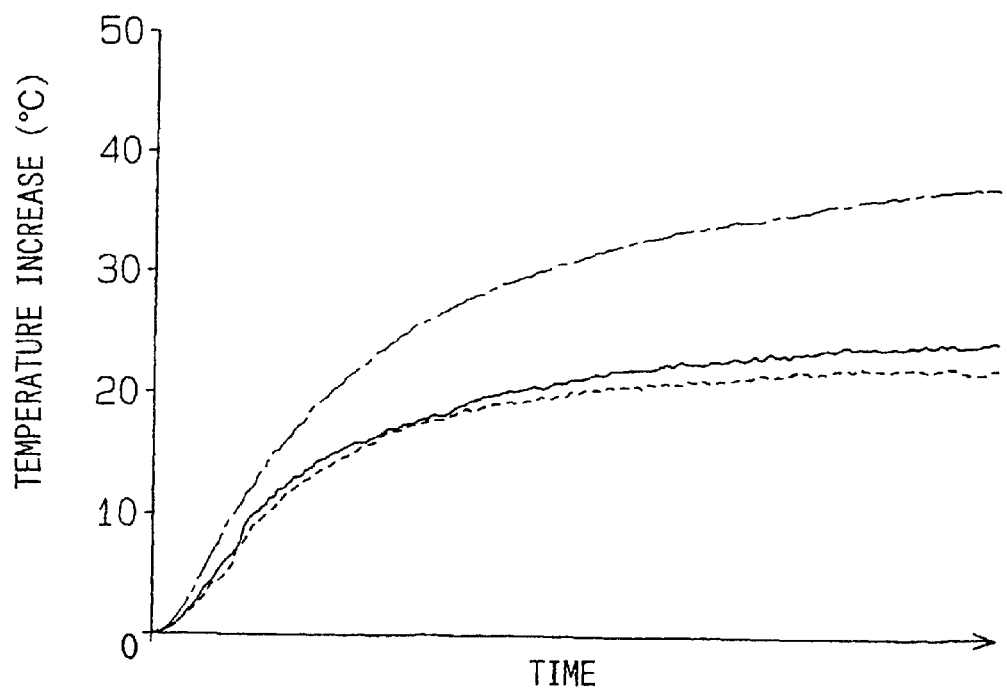
FIG. 6 is a graph showing changes in temperature of a yoke surface for various motors during motor operation as a function of time.
Figure 7:
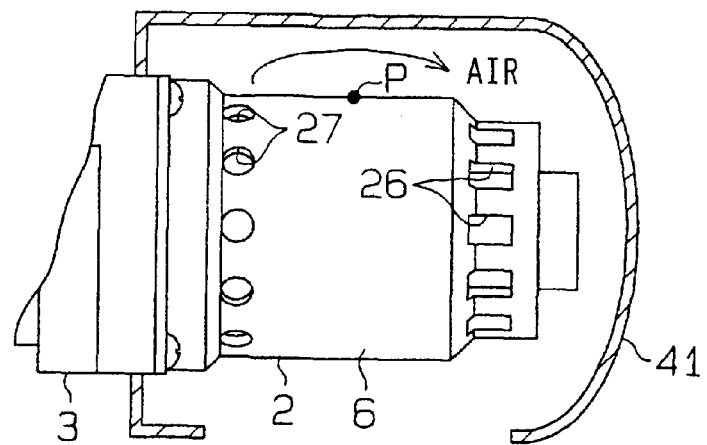
FIG. 7 is a partial cross sectional view showing a comparative water blocking cover without a separating structure.

FIG. 6 shows changes in surface temperature of the yoke 6 during the operation of the motor 1. In FIG. 6, result of the measurement in the wiper motor 1 having the water blocking cover 4 of the present embodiment is indicated with a solid line. Result of the measurement in the wiper motor 1, from which the water blocking cover 4 is removed, is indicated with a dotted line in FIG. 6. Result of the measurement in the wiper motor having a water blocking cover 41 shown in FIG. 7 is indicated with a dot-dash line in FIG. 6. Here, the water blocking cover 41 shown in FIG. 7 does not have a separating structure for separating the air directed to the air inlet openings 26 from the air discharged from the air outlet openings 27. An axial center point of the outer surface of the yoke 6 is used a measurement point P (FIG. 7), and the measurement of the surface temperature is initiated while the motor 1 is sufficiently cooled (i.e., the temperature of the outer surface of the yoke 6 is substantially the same as the temperature of the external air).

In the case shown in FIG. 7 where the water blocking cover 41 is installed to the motor, the air discharged from the air outlet openings 27 can be redrawn into the air inlet openings 26 through a space between the yoke 6 and the water blocking cover 41 due to the fact that a partition wall is not provided between the air intake side and the air exhaust side. As a result, sufficient cooling performance cannot be achieved, and the surface temperature of the yoke 6 becomes relatively high, as indicated with the dot-dash line in FIG. 6. On the other hand, in the motor 1 according to the present embodiment (the measured temperatures of this motor are indicated with the solid line in FIG. 6), the partitioning member 33 is provided in the water blocking cover 4, so that the air (external air) having the temperature lower than that of the interior of the motor 1 can be effectively introduced into the interior of the motor 1. As a result, the relatively high cooling performance, which is substantially equal to that of the motor having no water blocking cover 4 (the measured temperatures of this motor are indicated with the dotted line in FIG. 6), is achieved according to the present embodiment, thereby restraining the increase in the surface temperature of the yoke 6.

The above embodiment provides the following advantages.

(1) The partitioning member 33 is provided in the water blocking cover 4, so that the communication between the intake duct 31 and the exhaust duct 32 is restrained between the water blocking cover 4 and the exterior of the yoke 6. As a result, the air heated by cooling the interior of the motor 1 is restrained from being introduced into the intake duct 31 and is effectively discharged from the water blocking cover 4 through the exhaust duct 32. That is, the air in the exhaust duct side is restrained from being redrawn into the interior of the yoke 6. Therefore, the reduction in the cooling performance of the motor 1 can be restrained even when the water blocking cover 4 is installed to the motor 1.

(2) The air inlet openings 26 and the air outlet openings 27 are circumferentially arranged along the entire peripheral wall of the yoke 6, so that the total amount of air flow for cooling the interior of the motor 1 can be increased without increasing a flow velocity of the air. Particularly, the air inlet openings 26 of the present embodiment allow an increase in the amount of the intake air per unit time while restraining drawing of foreign particles, such as dusts or snow, into the interior of the yoke 6 from the outside of yoke 6 through the air inlet openings 26.

(3) The external opening of the intake duct 31 and the external opening of the exhaust duct 32 are oriented in the direction of gravity (this is the downward direction measured when the motor 1 is installed in the vehicle). Thus, when the water is applied to the motor 1, the water is restrained from entering into the interior of the water blocking cover 4. More specifically, when the water is applied to the motor 1 in any directions except in a vertically upward direction toward a bottom side of the motor 1 (e.g., when the water is applied to the motor 1 in a horizontal direction or in an obliquely upward direction by splash), the intrusion of the water into the interior of the motor 1 can be restrained. Furthermore, even if water droplets are present on the inner wall surface of the water blocking cover 4, the water droplets can be effectively conducted to the external openings of the ducts 31, 32 along the inner wall surface of the water blocking cover 4 and can be drained from the external openings of the ducts 31, 32.

(4) In the above embodiment, the partitioning member 33 is secured to the water blocking cover 4. Thus, the yoke 6 of the motor 1 according to the present embodiment can be also used for a motor that is used in a dry environment where no water protecting means is required (i.e., the water blocking cover 4 is not required). This is practically preferred.

(5) The partitioning member 33 and the seal member 34 are made of the damping material. Thus, the vibrations of the motor 1 are restrained from being conducted to the water blocking cover 4. As a result, generation of noises in the water blocking cover 4 by vibrational resonance can be restrained.

The above embodiment can be modified as follows.

Figure 8:
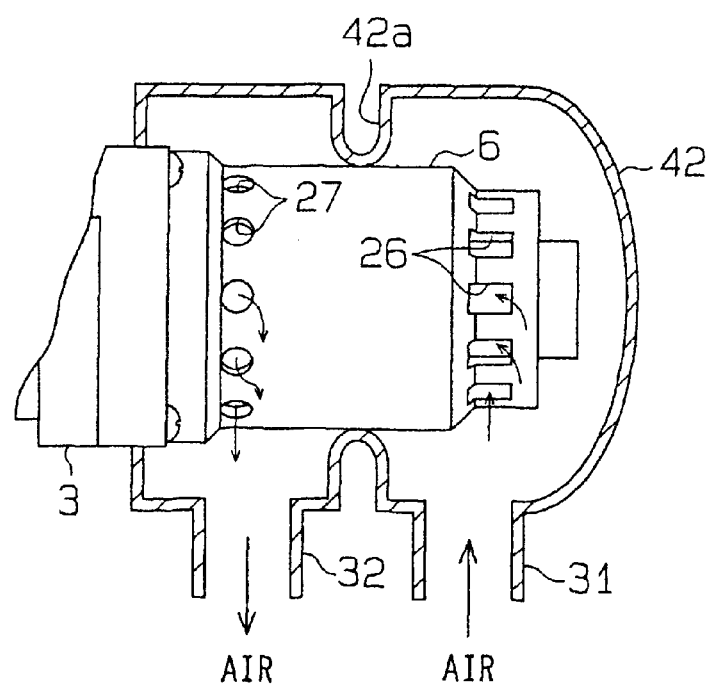
FIG. 8 is a partial cross sectional view showing a modification of the water blocking cover according to the first embodiment of the present invention.

In the above embodiment, the partitioning member 33, which acts as the partition wall, is provided in the water blocking cover 4. The present invention is not limited to this form. For example, with reference to FIG. 8, a circumferentially extending neck 42a, which acts as a partition wall, can be formed in a water blocking cover 42. With reference to FIG. 8, a radial inner end of the neck 42a is in close contact with the outer peripheral surface of the yoke 6, so that the neck 42a substantially separates the air in the intake duct 31 from the air in the exhaust duct 32. Even with this arrangement, the air heated in the interior of the motor is not introduced into the intake duct 31 and is effectively discharged from the exhaust duct 32 to the atmosphere, thereby restraining the reduction of the cooling performance.

Figure 9:
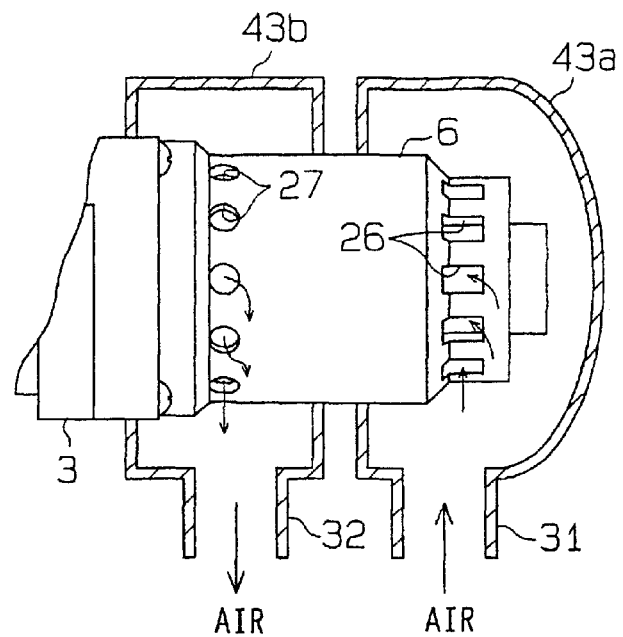
FIG. 9 is a partial cross sectional view showing another modification of the water blocking cover according to the first embodiment of the present invention.
Figure 10:
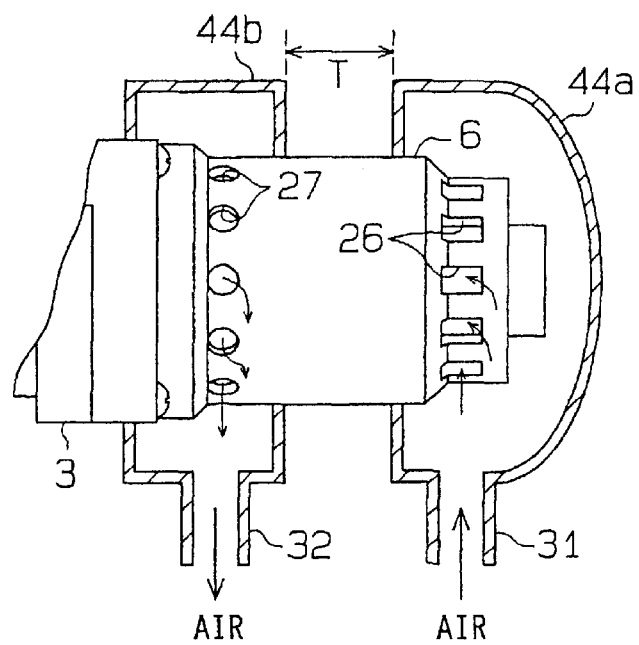
FIG. 10 is a partial cross sectional view showing a further modification of the water blocking cover according to the first embodiment of the present invention.

Furthermore, with reference to FIG. 9, alternative to the water blocking cover 4, a first water blocking cover 43a for covering the air inlet openings 26 and a second water blocking cover 43b for covering the air outlet openings 27 can be provided. The first water blocking cover 43a has the intake duct 31, and the second water blocking cover 43b has the exhaust duct 32. In the above embodiment where the partitioning member 33 is provided in the water blocking cover 4, the heat of the heated air in the exhaust duct 32 side can be conducted to the air in the intake duct 31 side through the partitioning member 33. Contrary to this, when the yoke 6 is covered with the separate water blocking covers 43a, 43b, as shown in FIG. 9, the heat in the exhaust side is not easily conducted to the intake side. Furthermore, a portion of the outer surface of the yoke 6, which is located between the first water blocking cover 43a and the second water blocking cover 43b, is directly exposed to the external air, so that the cooling performance of the motor can be improved. Particularly, as shown in FIG. 10, if a wider space T is provided between the first water blocking cover 44a and the second water blocking cover 44b, a portion of the outer surface area of the yoke 6, which is directly exposed to the external air, is increased, thereby improving the cooling performance of the yoke 6. Furthermore, if the separate water blocking covers are applied to a motor including a yoke, which has a profile smaller than that of the yoke 6 of the above embodiment, it is possible to reduce sizes of the water blocking covers. The smaller water blocking covers are preferred for practical use.

Figure 11:
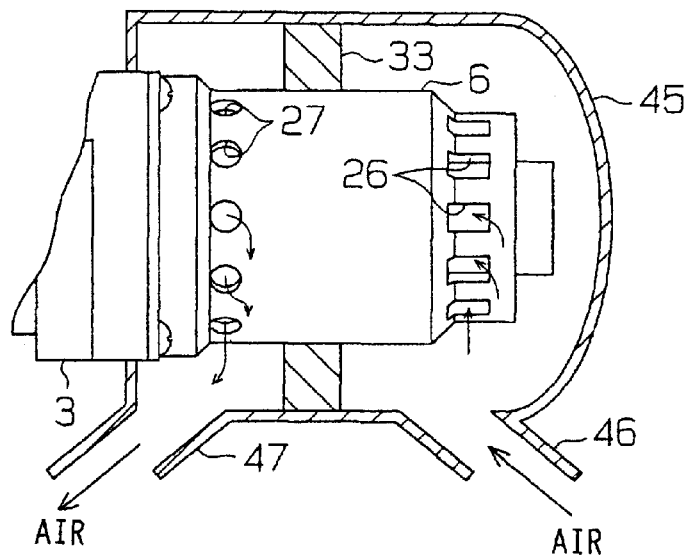
FIG. 11 is a partial cross sectional view showing a further modification of the water blocking cover according to the first embodiment of the present invention.
Figure 12:
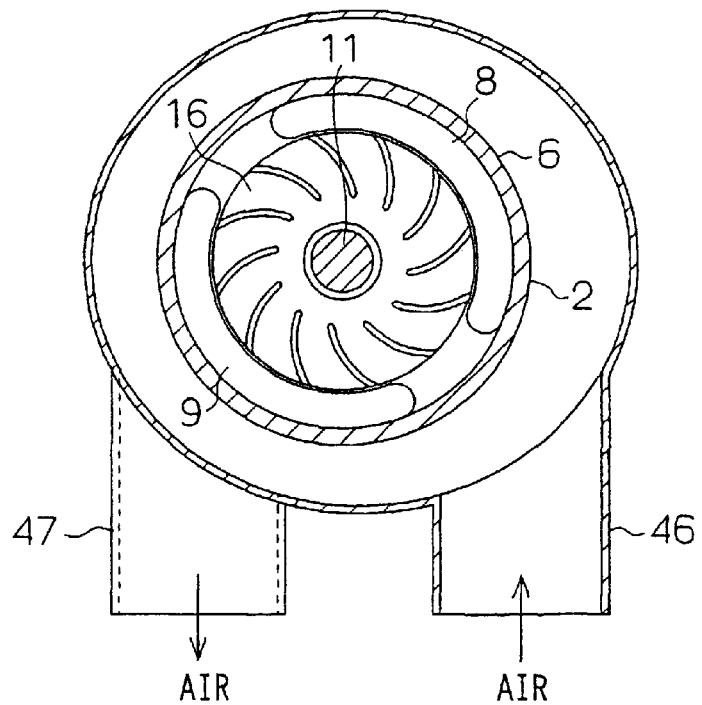
FIG. 12 is a partial cross sectional view showing a further modification of the water blocking cover according to the first embodiment of the present invention.

As shown in FIG. 11, the external opening of the intake duct 46 and the external opening of the exhaust duct 47 can be oriented in generally opposite directions. With this arrangement, the air discharged from the exhaust duct 47 is not mixed with the air supplied from the intake duct 46, thereby improving the cooling performance of the motor. Particularly, with reference to FIG. 12, the intake duct 46 and the exhaust duct 47 can be arranged such that the intake duct 46 and the exhaust duct 47 are not aligned in an axial direction of the yoke 6. In this way, the cooling performance of the motor can be improved.

Figure 13:
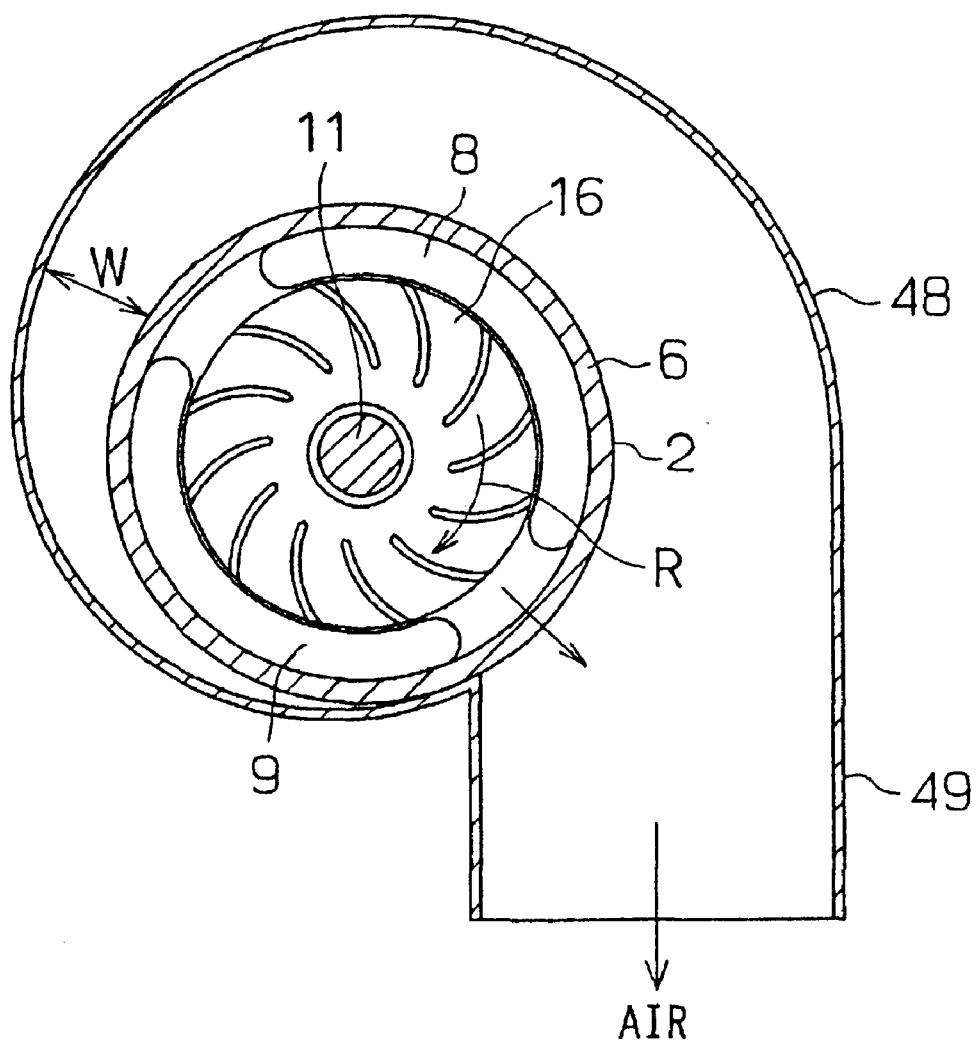
FIG. 13 is a partial cross sectional view showing a further modification of the water blocking cover according to the first embodiment of the present invention.

Furthermore, as shown in FIG. 13, a shape of a water blocking cover 48 can be formed into a scroll shape or vortex shape. In the interior of the yoke 6, the cooling fan 16 is rotated in a rotational direction R to generate the air flow around the rotational axis of the armature 7. The water blocking cover 48 of FIG. 13 is shaped to scroll in the flow direction of the air (i.e., a space W between the outer peripheral surface of the yoke 6 and the inner peripheral surface of the water blocking cover 48 is progressively increased in the flow direction of the air). That is, an air passage formed between the water blocking cover 48 and the yoke 6 is shaped into the scroll shape and is thus progressively widened in the flow direction of the air. The flow direction of the air depends not only on the rotational direction of the cooling fan 16 but also depends on other factors, such as the positions and shapes of the components arranged in the yoke 6. Thus, the shape of the water blocking cover 48 can be modified to any appropriate form based on the other factors. FIG. 13 only shows the cross section of the water blocking cover 48 at the exhaust duct 49 side. An intake duct side of the water blocking cover 48 is formed in a manner similar to that of the exhaust duct 49 side. That is, in the water blocking cover 48, the external opening of the intake duct and the external opening of the exhaust duct 49 extend in a direction tangential to the flow direction of the air within the yoke 6. The air is introduced into the interior of the yoke 6 through the inlet openings in a radial direction of the armature 7. Then, the air, which has cooled the interior of the yoke 6, is discharged from the yoke 6 through the outlet openings in the radial direction of the armature 7. Thus, the scroll shaped water blocking cover 48 can reduce resistance of the air along the inner surface of the water blocking cover 48, allowing smooth flow of the air. That is, the amount of the air for cooling the motor can be increased to improve the cooling performance of the motor.

Furthermore, with reference to FIG. 13, when the magnets 8, 9 are circumferentially arranged at predetermined angular intervals along the inner peripheral surface of the yoke 6, the amount of the air flow through each circumferential space defined between the magnets 8, 9 becomes higher than that of any other location in the yoke 6. Thus, the amount of the air flow through the respective air outlet opening 27 located adjacent to each circumferential space defined between the magnets 8, 9 is increased in comparison to the other air outlet openings 27 located apart from the circumferential space. As a result, as shown in FIG. 13, when the exhaust duct 49 is arranged adjacent to the respective circumferential space defined between the magnets 8, 9, the air can be effectively discharged to the atmosphere from the interior of the yoke 6 through the water blocking cover 48.

In the above embodiment, the air inlet openings 26 and the air outlet openings 27 are circumferentially arranged along the entire peripheral wall of the yoke 6. The present invention is not limited to this arrangement. It is only required to provide at least one air inlet opening 26 and at least one air outlet opening 27. However, in this case, one or more of the at least one air outlet opening 27 should be located adjacent to or in the corresponding circumferential space defined between the magnets 8, 9 in the yoke 6 to maintain sufficient air flow in the yoke 6.

In the above embodiment, the one pair of the magnets 8, 9 are arranged along the inner peripheral surface of the yoke 6. The present invention is not limited to this arrangement. For example, two or more pairs of magnets can be arranged along the inner peripheral surface of the yoke 6. If these magnets are circumferentially spaced from one another for a predetermined circumferential interval, the air outlet opening 27 should be located adjacent to the corresponding circumferential space.

Figure 14:
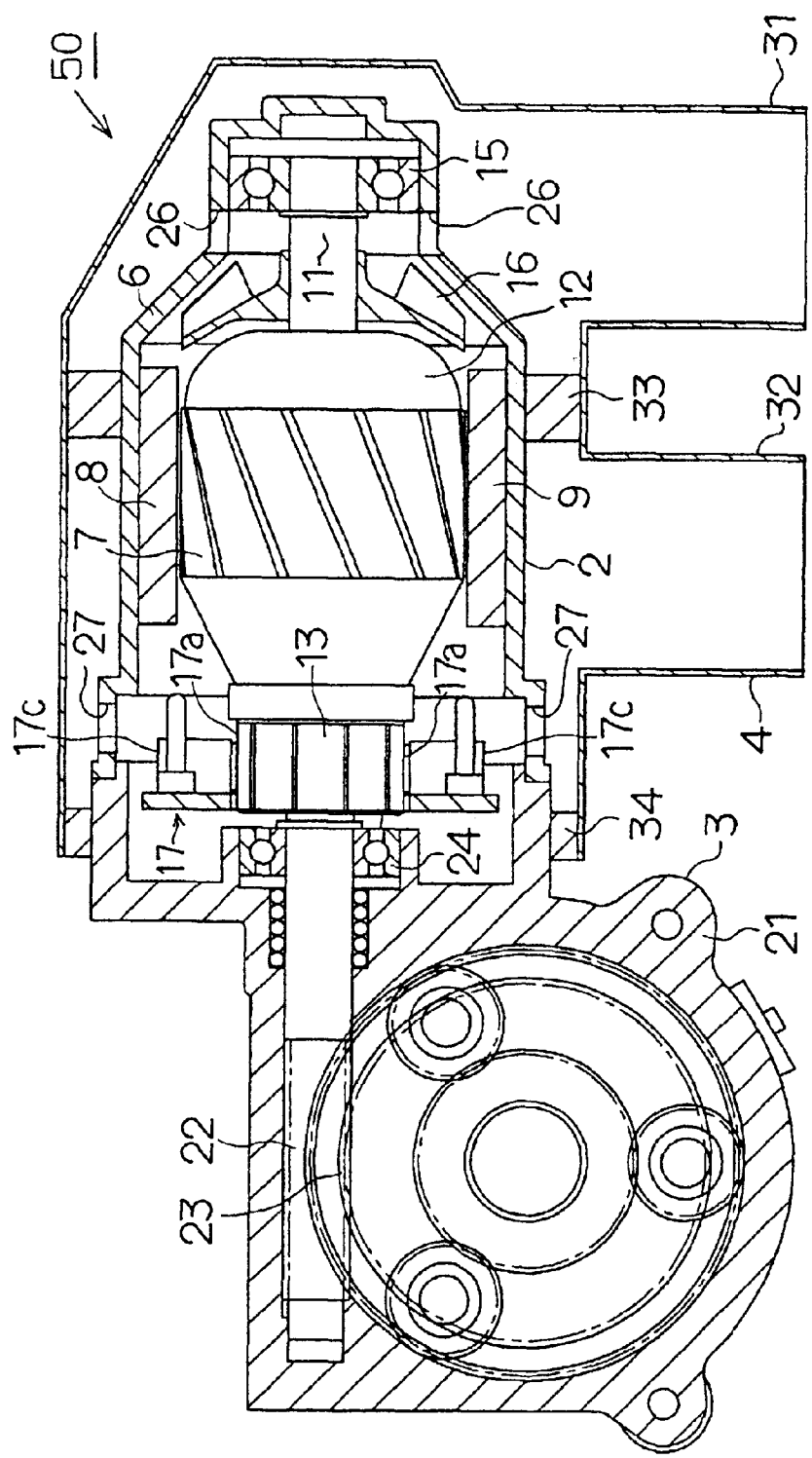
FIG. 14 is a cross sectional view showing a modification of the motor according to the first embodiment of the present invention.

In the wiper motor 1 shown in FIG. 1, the brush cover 29 is arranged at the open end side of the yoke 6 to restrain the air in the yoke 6 from approaching the commutator 13 and the brushes 17a. As shown in FIG. 14, the brush cover 29 can be eliminated from a motor 50 if the motor 50 is not used in the environment where the wet air (particularly the wet salty air) is not present, or a large amount of suspensions (e.g., dusts) are present. In the motor 50 shown in FIG. 14, the air outlet openings 27 are located adjacent to the commutator 13 and the brushes 17a, so that the air flow is effectively generated around the commutator 13 and the brushes 17a where a relatively large amount of the heat is generated. Also in the motor 50, the air inlet openings 26 of the yoke 6 are arranged at the end (the end where the cooling fan 16 is arranged) opposite to the end where the commutator 13 is arranged. In this case, the air introduced into the yoke 6 through the air inlet openings 26 does not directly approach the commutator 13 and the brushes 17a. In other words, the air introduced into the yoke 6 through the air inlet openings 26 need to pass through the interior of the yoke 6 before it reaches the commutator 13 and the brushes 17a. Thus, the foreign particles suspended in the air introduced into the yoke 6 will less likely to adhere to the commutator 13 and the brushes 17a. As a result, deterioration in the commutating performance in the motor caused by the adhesion of the foreign particles can be restrained. However, if the brush cover 29 is arranged in the motor 50 in a manner similar to that of FIG. 1, the positions of the air inlet openings 26 and the positions of the air outlet openings 27 can be reversed.

In the above embodiment, the present invention is embodied in the wiper motor 1 for driving the wipers of the vehicle. However, it should be noted that the present invention can be embodied in any other types of motors. These motors can include motors other than those used in vehicles.

(Second Embodiment)

Figure 15:
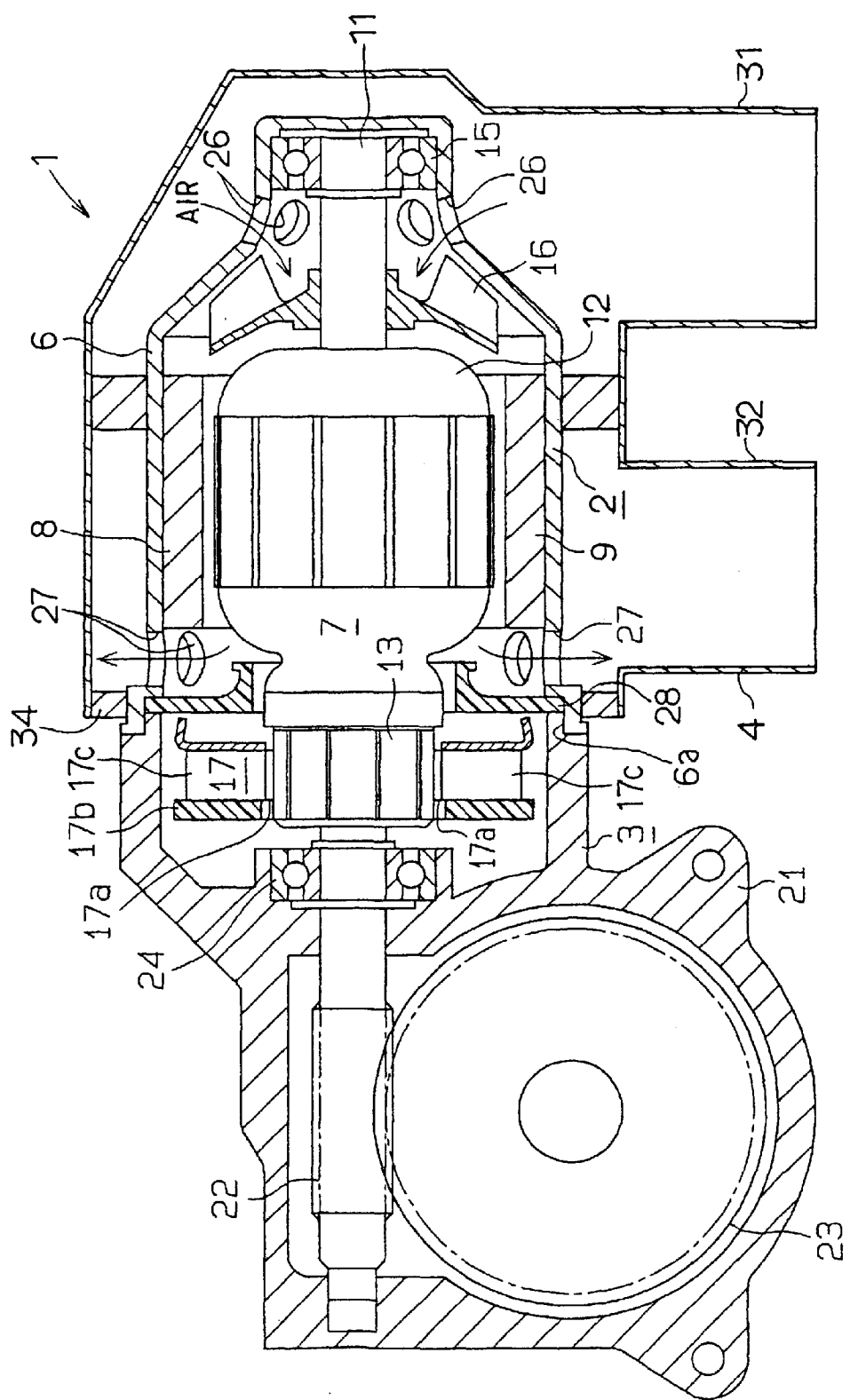
FIG. 15 is a cross sectional view of a wiper motor according to a second embodiment of the present invention.
Figure 16:
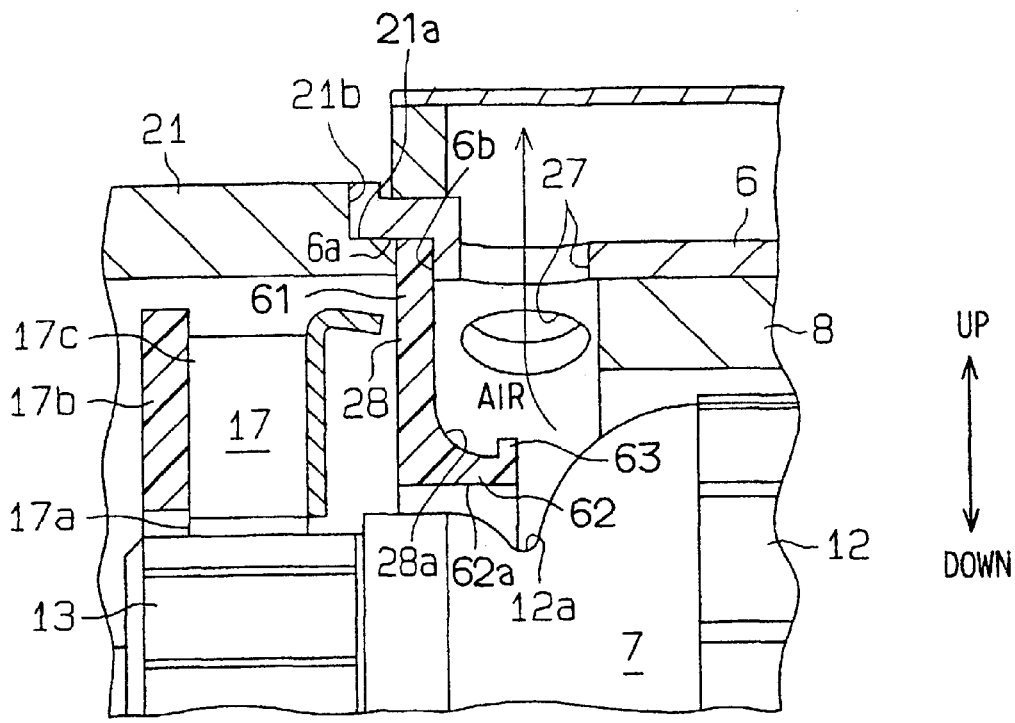
FIG. 16 is a partial enlarged cross sectional view of FIG. 15.

A wiper motor for driving wipers of a vehicle according to a second embodiment of the present invention will be described with reference to the accompanying drawings. Components similar to those discussed in the first embodiment will be indicated with similar numerals in the second embodiment and will not be discussed in greater details below. FIG. 15 is a schematic cross sectional view of the wiper motor 1 according to the second embodiment. FIG. 16 is a partial enlarged cross sectional view of the wiper motor shown in FIG. 15.

As shown in FIG. 15, the wiper motor 1 includes a motor main body 2, a speed reducing unit 3 and a water blocking cover 4. The speed reducing unit 3 is secured to the motor main body 2. A structure of the water blocking cover 4 is substantially the same as that of the first embodiment and thus will not be discussed further below. The motor main body 2 includes a cylindrical cup-shaped yoke 6, an armature 7 and a pair of magnets 8, 9. The armature 7 is received within the yoke 6. The magnets 8, 9 are secured to an inner peripheral surface of the yoke 6.

As shown in FIG. 16, an engaging surface 6a is formed in an inner peripheral surface of an open end of the yoke 6 and is stepped at a step portion 6b to have an increased inner diameter.

As shown in FIG. 15, the armature 7 includes a rotatable shaft 11, a core/winding portion 12 and a commutator 13. A base end of the rotatable shaft 11 is rotatably supported by a bearing 15 secured to a base of the yoke 6.

The core/winding portion 12 is secured to an axially middle portion of the rotatable shaft 11 and is radially opposed to the magnets 8, 9. The commutator 13 is secured to a distal end side of the rotatable shaft 11 (distal to the core/winding portion 12). In the present embodiment, windings are wound to twist 180 degrees, so that the windings are wound around the rotatable shaft 11 at a position apart from the commutator 13 on a base end side of the commutator 13 to form a waist 12a, as shown in FIG. 16. The waist 12a restrains conduction of a water droplet applied on the windings to reach the commutator 13 along the windings.

A cooling fan 16 is secured to a base end side of the rotatable shaft 11 between the core/winding portion 12 and the bearing 15. That is, the commutator 13 is secured to the one end side of the rotatable shaft 11, and the cooling fan 16 is secured to the other end side of the rotatable shaft 11. The cooling fan 16 of the present embodiment is a turbofan.

A pair of brushes 17a are supported in a brush holder assembly 17. That is, as shown in FIG. 16, the brush holder assembly 17 includes a brush insulator 17b and a pair of brush holders 17c. The brush insulator 17b is made of a dielectric resin material and is shaped into a generally annular disc shape. Furthermore, the brush insulator 17b is secured to the speed reducing unit 3 (acting as a stationary portion of the motor). The brush holders 17c are secured to the brush insulator 17b and are radially opposed to the commutator 13. The brushes 17a supported by the brush holders 17c are in sliding contact with the commutator 13. When electric current is supplied to the core/winding portion 12 through the brushes 17a and the commutator 13, the cooling fan 16 is rotated together with the armature 7 (rotatable shaft 11).

The speed reducing unit 3 includes a gear housing 21 and a worm gear (a worm 22 and a worm wheel 23) received in the gear housing 21. The gear housing 21 acts as an end housing having an open end, which corresponds to and is connected to the open end of the yoke 6.

As shown in FIG. 16, the outer peripheral surface of the open end side of the gear housing 21 has an engaging surface 21a, which is stepped at a step portion 21b to have a reduced outer diameter. The outer diameter of the engaging surface 21a is substantially the same as the inner diameter of the engaging surface 6a of the yoke 6. The engaging surface 21a of the gear housing 21 is engaged with the engaging surface 6a of the yoke 6, and the gear housing 21 is secured to the yoke 6 to close the open end of the yoke 6.

As shown in FIG. 15, a bearing 24 is secured to the gear housing 21 to rotatably support the distal end side of the rotatable shaft 11. The worm 22 is formed in the distal end of the rotatable shaft 11, and the worm wheel 23 is meshed with the worm 22.

Air inlet openings 26 for introducing the external air into the yoke 6 are formed along a peripheral wall of the yoke 6 at the base side (first axial end portion) of the yoke 6 near the cooling fan 16. Furthermore, in the open end side (second axial end portion) of the yoke 6, air outlet openings 27 for discharging the air from the yoke 6 are circumferentially arranged along the peripheral wall of the yoke 6. The air outlet openings 27 are closer to the base end (right end in FIG. 15) of the yoke 6 than the step portion 6b of the yoke 6. In the present embodiment, the air inlet openings 26 and the air outlet openings 27 are circumferentially arranged at predetermined angular intervals along the entire peripheral wall of the yoke 6 to maintain sufficient flow (flow rate) of the air through the interior of the motor 1.

Figure 17:
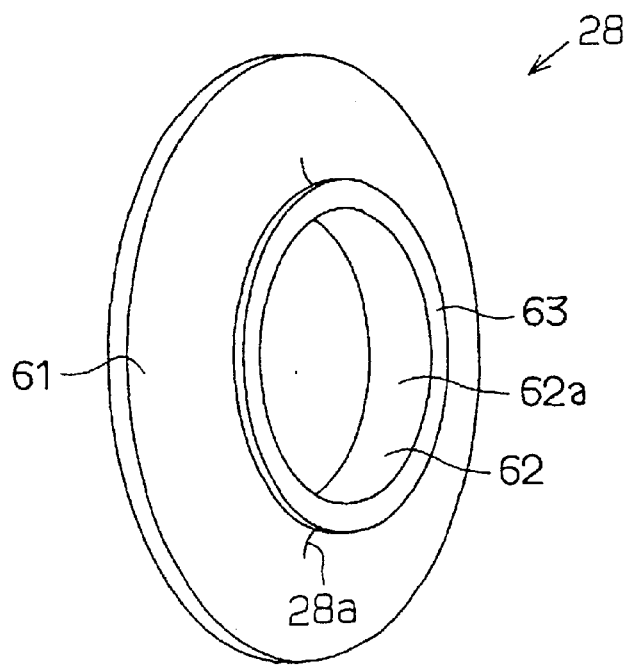
FIG. 17 is a perspective view of a brush cover according to the second embodiment.

As shown in FIG. 16, a brush cover 28 acting as a shielding member is provided at the open end of the yoke 6. With further reference to FIG. 17, the brush cover 28 is made of a dielectric resin material and includes an annular partition wall portion 61 and a cylindrical portion 62. The partition wall portion 61 has an outer diameter substantially equal to the inner diameter of the engaging surface 6a of the yoke 6. The cylindrical portion 62 has a receiving hole 62a, through which the commutator 13 is received. The partition wall portion 61 continuously extends radially outwardly from an outer peripheral edge of one axial end of the cylindrical portion 62, which faces the commutator 13. When the brush cover 28 is installed to the motor, the brush cover 28 contacts both the step portion 6b and the engaging surface 6a of the yoke 6. The brush cover 28 is securely clamped between an end surface of the open end of the gear housing 21 and the step portion 6b of the yoke 6 when the engaging surface 21a of the gear housing 21 is engaged with the engaging surface 6a of the yoke 6.

In the brush cover 28, a connection between the cylindrical portion 62 and the partition wall portion 61 is arcuately curved to form a curved portion 28a, which is radially opposed to the air outlet openings 27. When the external air, which has been blown by the cooling fan 16, is blocked by the brush cover 28 and is discharged from the yoke 6 through the air outlet openings 27, the curved portion 28a allows smooth deflection of the flow of the air in a radially outer direction toward the air outlet openings 27.

A return flange 63 protrudes radially outwardly along an entire peripheral edge of the other axial end (right end in FIG. 16) of the cylindrical portion 62 of the brush cover 28. For example, when one of the air outlet openings 27 is positioned to orient vertically upwardly, and water droplets are introduced into the interior of the yoke 6 through this opening 27, the flange 63 restrains the water droplets from falling to the commutator 13 side.

As described above, the present embodiment provides the following advantages.

(1) In the above embodiment, the cooling fan 16 is located on the one axial side of the air outlet openings 27, and the commutator 13 and the brush holder assembly 17 are located on the other axial side of the air outlet openings 27. The brush cover 28 substantially separates and shields the commutator 13 and the brush holder assembly 17 from the air outlet openings 27. Thus, even when the external air is relatively strongly blown by the cooling fan 16 toward the armature 7 (core/winding portion 12), which acts as a heat source, to effectively cool the armature 7, the brush cover 28 effectively shields the blown air. Thus, the blown air is not directly blown to the electrically conductive components, such as the commutator 13 and the brushes 17a (brush holder assembly 17), which conduct the electric current through the sliding contact. Therefore, when the external air has a relatively high humidity and a relatively high salt concentration, corrosion of the electrically conductive components (commutator 13 and the brushes 17a) by the salt and humidity can be restrained by restraining the direct blow of the air to these components by the brush cover 28. Similarly, when the external air contains relatively large amount of dusts, the adhesion of the dusts to the electrically conductive components (commutator 13 and the brushes 17a) can be restrained by restraining the direct blow of the air to these components by the brush cover 28. In this way, deterioration in the electrical conductivity of these electrically conductive components can be restrained.

(2) In the present embodiment, the curved portion 28a is formed in the connection between the partition wall portion 61 and the cylindrical portion 62. At the time when the external air blown by the cooling fan 16 is blocked by the brush cover 28 (partition wall portion 61) and is discharged from the air outlet openings 27, the air flow needs to be deflected to flow in the radially outward direction toward the air outlet openings 27. This deflection of the air flow is smoothly carried out along the curved portion 28a. Thus, stagnation of the air flow in the motor 1 (yoke 6) can be restrained, thereby improving the cooling performance of the motor.

(3) In the present embodiment, the cylindrical portion 62 has the flange 63, which protrudes radially outwardly along the entire peripheral edge of the other axial end (right end in FIG. 16) of the cylindrical portion 62. For example, when one of the air outlet openings 27 is positioned to orient in the vertically upward direction, the water droplets can be introduced into the interior of the yoke 6 through this opening 27. The water droplets can flow along the brush cover 28 and can drop into the receiving hole 62a of the cylindrical portion 62 toward the commutator 13 side. However, in the above embodiment, even when the water droplets are introduced into the interior of the yoke 6 through the air outlet openings 27, the water droplets flow downwardly along the outer peripheral surface of the cylindrical portion 62 without falling on the commutator 13 side because of the flange 63, which forms a return. That is, the water droplets adhered to the brush cover 28 are effectively restrained from falling on the commutator 13 side.

(4) In the present embodiment, the outer peripheral edge portion of the brush cover 28 is clamped between the yoke 6 (step portion 6b) and the gear housing 21 (end surface of the open end of the gear housing 21) to secure the brush cover 28. Thus, a securing member (e.g., bolts) for securing the brush cover 28 can be eliminated, allowing a reduction in the number of the components and the number of the assembling steps.

The present invention is not limited to the above embodiment. The above embodiment can be modified as follows.

In the above embodiment, the brush cover 28 is made of the dielectric resin material. Alternatively, the brush cover 28 can be made of any other dielectric material, such as a natural rubber or a synthetic rubber. Furthermore, if the brush cover 28 is effectively, electrically insulated from the electrically conductive components (e.g., the commutator 13 and the brushes 17a), the brush cover 28 can be made of a metal material.

Figure 18:
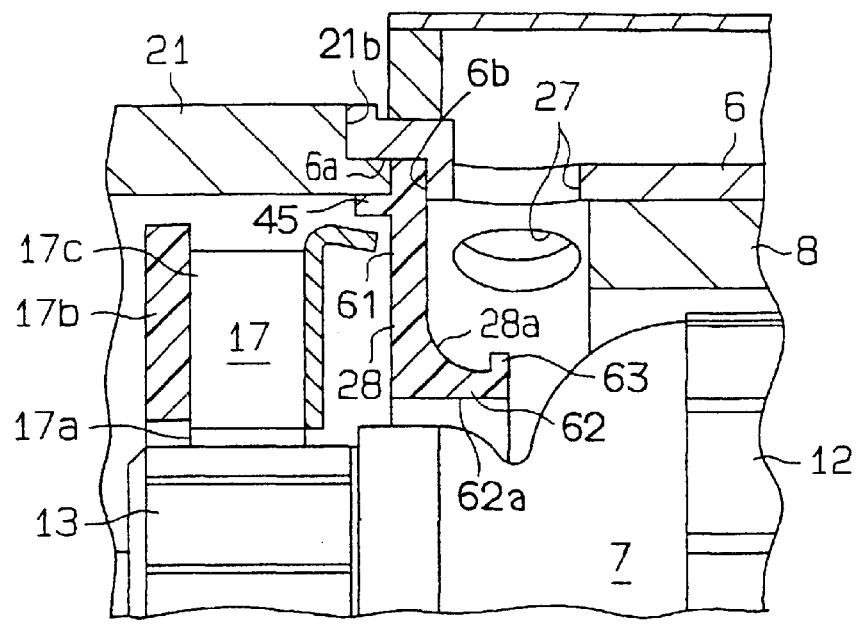
FIG. 18 is a partial enlarged cross sectional view similar to FIG. 16, showing a modification of the wiper motor according to the second embodiment.

In the above embodiment, the outer peripheral edge portion of the brush cover 28 is clamped between the yoke 6 (step portion 6b) and the gear housing 21 (end surface of the open end of the gear housing 21) to secure the brush cover 28. Alternatively, as shown in FIG. 18, a circumferentially extending engaging projection 45 can be formed along the partition wall portion 61 of the brush cover 28 on the gear housing 21 side of the brush cover 28. The engaging projection 45 has an outer diameter that is substantially the same as an inner diameter of the open end of the gear housing 21. The brush cover 28 can be fitted into the open end of the gear housing 21 through the engaging projection 45 to secure the brush cover 28 to the gear housing 21. In addition to or as an alternative to the engaging projection 45, a circumferentially extending engaging projection (not shown) can be formed along the partition wall portion 61 of the brush cover 28 on the yoke 6 side of the brush cover 28. This engaging projection has an outer diameter that is substantially the same as an inner diameter of the open end portion of the yoke 6. The brush cover 28 can be fitted into the open end of the yoke 6 through this engaging projection to secure the brush cover 28 to the yoke 6. Even with such a modification, the advantages similar to those discussed above can be achieved.

Figure 19:
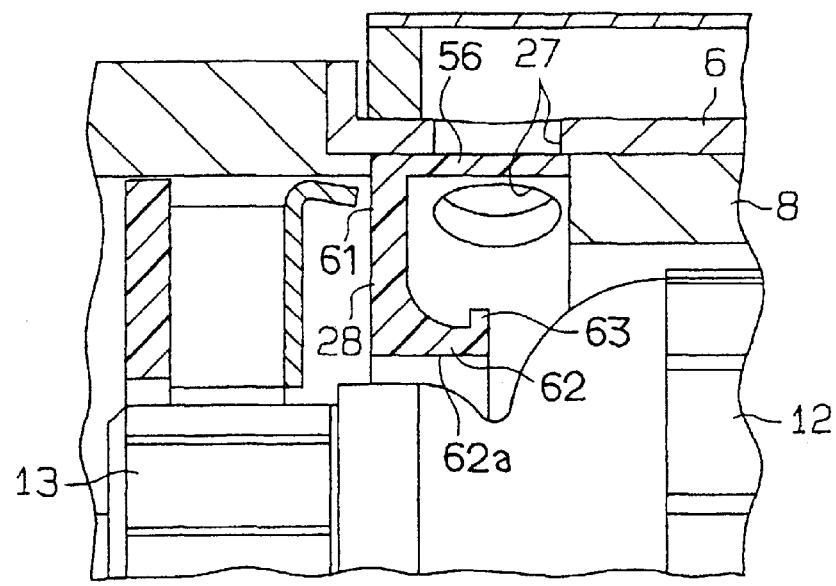
FIG. 19 is a partial enlarged cross sectional view similar to FIG. 16, showing another modification of the wiper motor according to the second embodiment.

In the above embodiment, the outer peripheral edge portion of brush cover 28 is clamped between the yoke 6 (step portion 6b) and the gear housing 21 (end surface of the open end of the gear housing 21) to secure the brush cover 28. If the step portion 6b of the yoke 6 is not present, as shown in FIG. 19, an extension 56 can be formed along the outer peripheral edge of the partition wall portion 61 of the brush cover 28 on the yoke 6 side of the brush cover 28. The extension 56 of the brush cover 28 has an outer diameter that is substantially the same as the inner diameter of the open end of the yoke 6 and abuts against the magnets 8, 9. The extension 56 of the brush cover 28 is clamped between the magnets 8, 9 and the gear housing 21 (end surface of the open end) to secure the brush cover 28. Even with this modification, advantages similar to those of the above embodiment can be achieved. Although the extension 56 is simplified in FIG. 19, it should be noted that the extension 56 has openings, which correspond to the air outlet openings 27, respectively, to allow flow of the air through the air outlet openings 27.

Figure 20:
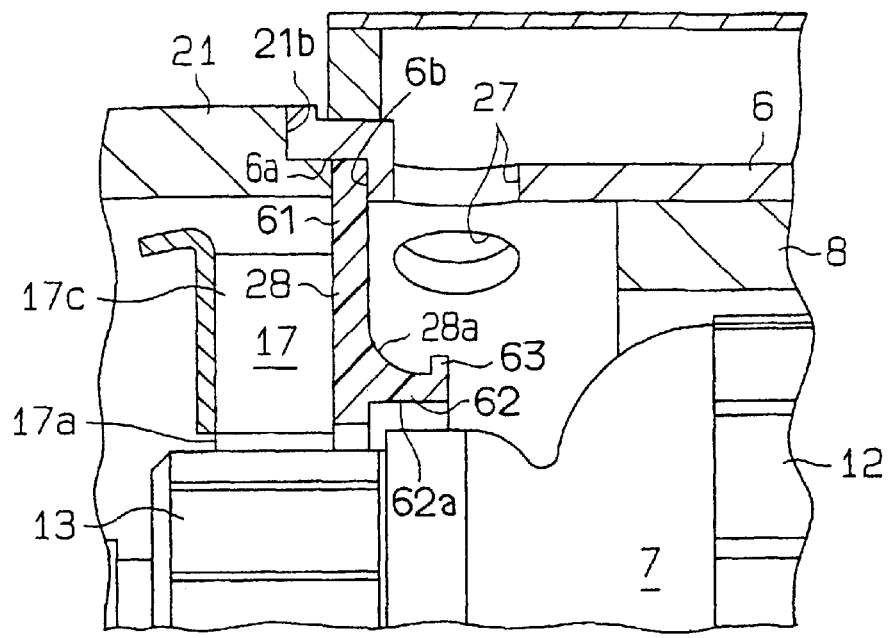
FIG. 20 is a partial enlarged cross sectional view similar to FIG. 16, showing a further modification of the wiper motor according to the second embodiment.

In the above embodiment, the brush cover 28 can be also used as the brush insulator of the brush holder assembly 17. That is, the brush cover 28 of FIG. 20 can be used as the brush insulator. In this case, the brush holders 17c are secured to the brush cover 28 (partition wall portion 61) on the side opposite to the cooling fan 16 to form the brush holder assembly 17. With this modification, in addition to advantages similar to those of the above embodiment, the number of the components and the number of the assembling steps can be advantageously reduced.

Figure 21:
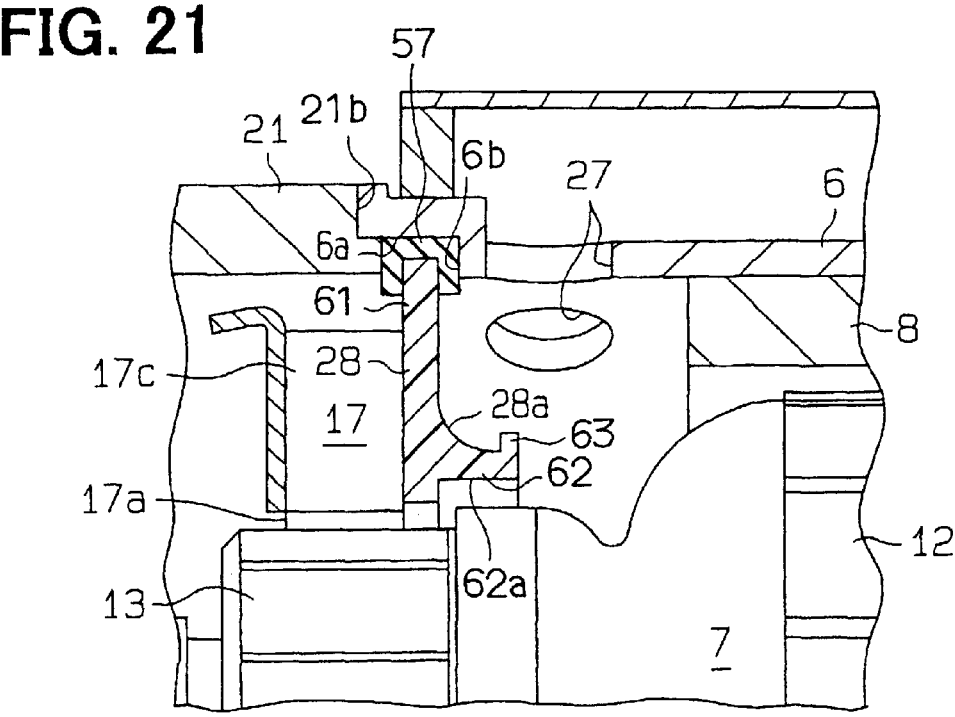
FIG. 21 is a partial enlarged cross sectional view similar to FIG. 16, showing a further modification of the wiper motor according to the second embodiment.

In the above embodiment, the outer peripheral edge portion of the brush cover 28 is clamped between the yoke 6 (step portion 6b) and the gear housing 21 (end surface of the open end of the gear housing 21) to secure the brush cover 28. Alternative to this, the outer peripheral edge portion of the brush cover 28 can be clamped between the yoke 6 (step portion 6b) and the gear housing 21 (end surface of the open end of the gear housing 21) via a grommet (waterproof rubber) 57, as shown in FIG. 21. With this modification, in addition to advantages similar to those of the above embodiment, water impermeability at the connection between the yoke 6 and the gear housing 21 (between the yoke 6 and the brush cover 28, and also between the gear housing 21 and the brush cover 28) can be advantageously improved. Also, as shown in FIG. 21, if the brush cover 28 is also used as the brush insulator of the brush holder assembly 17, the brushes 17a are floatingly supported through the grommet 57. As a result, conduction of the vibrations from the outside (yoke 8 and the gear housing 21) to the brushes 17a can be reduced to reduce the brush sliding noises.

In the above embodiment, the outer peripheral edge portion of the brush cover 28 is clamped between the yoke 6 (step portion 6b) and the gear housing 21 (end surface of the open end of the gear housing 21) to secure the brush cover 28. A securing member (e.g., bolts) for securing the brush cover 28 can be provided to secure the brush cover 28 to the stationary portion (e.g., the yoke 6 or the gear housing 21) of the motor. Even with this modification, advantages similar to those discussed in the above sections (2) and (3) of the second embodiment can be achieved.

In the above embodiment, the present invention is embodied in the wiper motor 1 having the speed reducing unit 3, and the open end of the yoke 6 is closed by the gear housing 21. Alternatively, the present invention can be embodied in a motor having no speed reducing unit. In such a case, a separate end housing is provided to close the open end of the yoke 6. Further alternatively, the yoke and the end housing can be molded together as an integral body to eliminate the open end of the yoke and the open end of the end housing. Even with such a modification, advantages similar to those of the above embodiment can be achieved.

Additional advantages and modifications will readily occur to those skilled in the art. The invention in its broader terms is therefore, not limited to the specific details, representative apparatus, and illustrative examples shown and described.

What is claimed is:

1. An electric motor comprising:
   an armature including a rotatable shaft;
   a cooling fan secured to the rotatable shaft of the armature to rotate integrally with the rotatable shaft;
   a yoke receiving the armature and the cooling fan and having at least one air inlet opening and at least one air outlet opening, wherein the at least one air inlet opening is located at a first axial end portion of the yoke and penetrates through a wall of the yoke to introduce air into an interior of the yoke upon rotation of the cooling fan, and the at least one air outlet opening is located at a second axial end portion of the yoke and penetrates through the wall of the yoke to discharge the air from the interior of the yoke upon the rotation of the cooling fan; and
   a water blocking cover substantially blocking intrusion of water into the interior of the yoke by substantially covering the at least one air inlet opening and the at least one air outlet opening of the yoke, wherein the water blocking cover includes:
      an intake duct, through said intake duct the air is drawn from outside of the water blocking cover into the at least one air inlet opening upon the rotation of the cooling fan;
      an exhaust duct, through said exhaust duct the air is discharged from the at least one air outlet opening to the outside of the water blocking cover upon the rotation of the cooling fan; and
      a communication restraining portion being located in a space between the water blocking cover and the yoke and restrains free communication of the air between the intake duct and the exhaust duct through the space between the water blocking cover and the yoke.

2. An electric motor according to claim 1, wherein an external opening of the intake duct and an external opening of the exhaust duct are oriented generally in a vertical direction.

3. An electric motor according to claim 1, further comprising a commutator being secured to the rotatable shaft near the second axial end portion of the yoke.

4. An electric motor according to claim 1, wherein the communication restraining portion is a partition wall being in close contact with an outer peripheral surface of the yoke and substantially partitions between the intake duct and the exhaust duct.

5. An electric motor according to claim 4, wherein the partition wall is made of a damping material.

6. An electric motor according to claim 1, wherein an external opening of the intake duct and an external opening of the exhaust duct are generally oriented in opposite directions.

7. An electric motor according to claim 1, further comprising a plurality of magnets being circumferentially arranged at predetermined angular intervals along an inner peripheral surface of the yoke, wherein at least one of the at least one air outlet opening is located adjacent to or in a space between the magnets.

8. An electric motor according to claim 3, further comprising
- a brush holder assembly being stationarily secured in the electric motor near the second axial end portion of the yoke and supports a plurality of brushes that are in sliding contact with the commutator to supply electric power to the commutator, wherein the cooling fan is located on one axial side of the at least one air outlet opening, and the commutator and the brush holder assembly are located on the other axial side of the at least one air outlet opening; and
- a shielding member substantially separating the commutator and the brush holder assembly from the at least one air outlet opening, so that the air drawn from the at least one air inlet opening upon the rotation of the cooling fan is substantially restrained from approaching the commutator and the brush holder assembly and is discharged from the at least one air outlet opening.

9. An electric motor according to claim 8, wherein the shielding member includes:
- a cylindrical portion having a generally cylindrical shape and includes a through hole that axially penetrates through the cylindrical portion to receive the commutator; and
- a shielding portion having a generally annular disc shape and extends radially outwardly from an outer peripheral edge of one axial end of the cylindrical portion, which faces the commutator, wherein a connection between the cylindrical portion and the shielding portion is curved to form a curved portion and is radially opposed to the at least one air outlet opening.

10. An electric motor according to claim 9, wherein the cylindrical portion of the shielding member has a return flange protruding radially outwardly from an outer peripheral edge of the other axial end of the cylindrical portion.

11. An electric motor according to claim 8, further comprising an end housing, which has an open end located adjacent to the second axial end portion of the yoke, wherein:
- the second axial end portion of the yoke is an open end and is connected with the open end of the end housing; and
- the shielding member is securely clamped between the yoke and the end housing through a waterproof rubber arranged along an outer peripheral edge of the shielding member.

12. An electric motor comprising:
- an armature including a rotatable shaft;
- a cooling fan secured to the rotatable shaft of the armature to rotate integrally with the rotatable shaft;
- a yoke receiving the armature and the cooling fan and having a plurality of air inlet openings and a plurality of air outlet openings, wherein the air inlet openings are circumferentially arranged along an entire peripheral wall of the yoke at a first axial end portion of the yoke and penetrate through the peripheral wall of the yoke to introduce air into an interior of the yoke upon rotation of the cooling fan, and the air outlet openings are circumferentially arranged along the entire peripheral wall of the yoke at a second axial end portion of the yoke and penetrate through the peripheral wall of the yoke to discharge the air from the interior of the yoke upon the rotation of the cooling fan; and
- a water blocking cover substantially blocking intrusion of water into the interior of the yoke by substantially covering the air inlet openings and the air outlet openings of the yoke, wherein the water blocking cover includes:
  - an intake duct, through said intake duct the air is drawn from outside of the water blocking cover into the air inlet openings upon the rotation of the cooling fan; and
  - an exhaust duct, through said exhaust duct the air is discharged from the air outlet openings to the outside of the water blocking cover upon the rotation of the cooling fan, wherein free communication between the intake duct and the exhaust duct is restrained between the water blocking cover and the yoke, and communication between the intake duct and the exhaust duct is allowed through the interior of the yoke.

13. An electric motor according to claim 12, wherein the air inlet openings are opposed to the cooling fan.

14. An electric motor according to claim 12, wherein:
- the water blocking cover has a scroll shape being scrolled in a flow direction of the air about a rotational axis of the armature within the yoke; and
- an external opening of the intake duct and an external opening of the exhaust duct extend in a direction tangential to the flow direction of the air within the yoke.

15. An electric motor according to claim 12, further comprising a plurality of magnets being circumferentially arranged at predetermined angular intervals along an inner peripheral surface of the yoke, wherein the exhaust duct is directly communicated with one of the air outlet openings, which is located between the magnets.

16. An electric motor comprising:
- an armature including a rotatable shaft;
- a cooling fan secured to the rotatable shaft of the armature to rotate integrally with the rotatable shaft;
- a yoke receiving the armature and the cooling fan and having at least one air inlet opening and at least one air outlet opening, wherein the at least one air inlet opening is located at a first axial end portion of the yoke and penetrates through a wall of the yoke to introduce air into an interior of the yoke upon rotation of the cooling fan, and the at least one air outlet opening is located at a second axial end portion of the yoke and penetrates through the wall of the yoke to discharge the air from the interior of the yoke upon the rotation of the cooling fan;
- a first water blocking cover substantially blocking intrusion of water into the interior of the yoke through the at least one air inlet opening by substantially covering the at least one air inlet opening and includes an intake duct, through said intake duct the air is drawn from outside of the first water blocking cover into the at least one air inlet opening upon the rotation of the cooling fan; and a second water blocking cover substaintially blocking intrusion of the water into the interior of the yoke through the at least one air outlet opening by substantially covering the at least one air outlet opening and includes an exhaust duct, through said exhaust duct the air is discharged from the at least one air outlet opening to outside of the second water blocking cover upon the rotation of the cooling fan.

* * * * *